United States Patent
Taniguchi et al.

(10) Patent No.: US 6,405,115 B2
(45) Date of Patent: Jun. 11, 2002

(54) SHIFT CONTROL SYSTEM FOR CONTINUOUSLY VARIABLE TRANSMISSIONS

(75) Inventors: Hiroji Taniguchi, Okazaki; Katsumi Kono, Toyota; Kenji Matsuo, Toyota; Hideki Yasue, Toyota; Tadashi Tamura, Aichi-ken; Daisuke Inoue, Toyota; Yoshiaki Yamamoto, Toyota; Hiroshi Morioka, Toyota; Hiroki Kondo, Toyota; Ryoji Habuchi, Okazaki; Yuji Hattori, Bisai, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/854,471

(22) Filed: May 15, 2001

(30) Foreign Application Priority Data

May 16, 2000 (JP) ........................ 2000-143856

(51) Int. Cl.[7] .............................................. B60K 41/06
(52) U.S. Cl. ........................... 701/51; 477/34; 477/63; 180/170; 701/54
(58) Field of Search ........................... 701/51, 54, 65; 180/170; 477/34, 63, 64, 65

(56) References Cited

U.S. PATENT DOCUMENTS

| | | | | |
|---|---|---|---|---|
| 3,713,351 A | * | 1/1973 | Sakakibara et al. | 192/222 |
| 3,802,293 A | * | 4/1974 | Winckler et al. | 74/331 |
| 4,682,518 A | * | 7/1987 | Takada et al. | 475/209 |
| 4,702,725 A | * | 10/1987 | Kouno et al. | 474/18 |
| 4,744,269 A | * | 5/1988 | Greene et al. | 192/3.3 |
| 4,817,473 A | * | 4/1989 | Baltusis et al. | 192/3.3 |
| 4,893,526 A | * | 1/1990 | Tokoro | 477/43 |
| 4,896,565 A | * | 1/1990 | Simonyi et al. | 192/3.31 |
| 5,005,441 A | * | 4/1991 | Narita | 477/150 |
| 5,172,609 A | * | 12/1992 | Nitz et al. | 477/129 |
| 5,233,525 A | * | 8/1993 | Overmann et al. | 477/123 |
| 5,287,773 A | * | 2/1994 | Nakawaki et al. | 477/110 |
| 5,522,777 A | * | 6/1996 | Baxter et al. | 180/247 |
| 5,569,110 A | * | 10/1996 | Warren | 418/21 |
| 5,743,829 A | * | 4/1998 | Tanizawa et al. | 477/174 |
| 5,941,793 A | * | 8/1999 | Ito et al. | 477/120 |
| 6,059,690 A | * | 5/2000 | Tanizawa et al. | 477/169 |
| 6,209,672 B1 | * | 4/2001 | Severinsky | 180/65.2 |
| 6,242,873 B1 | * | 6/2001 | Drozdz et al. | 180/65.1 |

* cited by examiner

*Primary Examiner*—William A. Cuchlinski, Jr.
*Assistant Examiner*—Olga Hernandez
(74) *Attorney, Agent, or Firm*—Oblon, Spivak, McClelland, Maier & Neustadt, P.C.

(57) ABSTRACT

A shift control system for a continuously variable transmission, in which a road load on a vehicle is detected, the lower limit speed is set according to the detected road load, in which a target input speed, as set according to the running state of a vehicle, is restricted with the set lower limit speed, and in which the gear ratio of the continuously variable transmission is controlled so that the actual input speed may be equal to the target input speed restricted. The target input speed is restricted after the actual input speed is more than the lower limit value, when the road load is light, and said target input speed is restricted irrespective of the actual input speed when the road load is heavy.

18 Claims, 4 Drawing Sheets

SHIFT CONTROL SYSTEM FOR CONTINUOUSLY VARIABLE TRANSMISSIONS

BACKGROUND OF THE INVENTION

1. Field of the Invention

The present invention relates to a control system for controlling speed changes in a continuously variable transmission and, more particularly, to a shift control system for controlling a continuously variable transmission to restrict an input speed.

2. Related Art

The continuously variable transmission can change a gear ratio continuously, as well known in the art, to set the gear ratio so that a speed of a prime mover such as an engine connected to the input side of the transmission may be suitable for the current running state. In the continuously variable transmission mounted on a vehicle employing an internal combustion engine (as will be abbreviated into "engine") as a prime mover, therefore, the gear ratio is so controlled as to equalize a speed of the engine to a speed achieved at an optimum running point for the best fuel economy.

If such control is executed in all running states, however, the driving force may be short to deteriorate the drivability. This is exemplified by the case in which the vehicle runs on an uphill. If the continuously variable transmission is controlled to reduce the engine speed as the vehicle speed rises, the driving torque lowers. In Japanese Patent Laid-Open No. 7-71556, therefore, there is disclosed a control system for setting a target input speed of the continuously variable transmission to a larger value for a heavier road load of the uphill run. This control system is constructed such that a lower limit value of the target input speed is restricted when the road load is so heavy as experienced by the uphill run.

In the invention disclosed in the aforementioned Laid-Open, the gear ratio is so controlled, when the road load is heavy, as to increase the input speed of the continuously variable transmission, i.e., the engine speed. Therefore, the driving force is retained on the uphill to improve the drivability. However, the system of the prior art thus far described inhibits the setting of a target input speed on a lower speed side, as could otherwise be set for an ordinary run, when the road load is heavy, so that a restricted lower limit speed on a higher speed side is employed as the target input speed.

If an actual input speed at the instant when the decision of a heavy load state for the high road load holds is lower than the restricted lower limit value, therefore, the target input speed is set to a lower limit value on a higher speed side by deciding the heavy load state and restricting the lower limit speed accordingly. Although no accelerator depression is performed for augmenting the driving force, more specifically, the input speed of the continuously variable transmission, i.e., the engine speed may increase according to the decision of the heavy load state, and the driver may be given a physical discomfort, or the drivability may deteriorate.

In order to eliminate this disadvantage, it is conceivable to make the following restriction. There may occur the case in which the actual input speed at the time of deciding the heavy road load state is lower than the aforementioned lower limit value. In this case, the lower limit value of the target input speed is restricted after the actual input speed exceeds the lower limit value. In the system for this control, however, the actual input speed may not exceed the lower limit value although the decision of the heavy load state is made. In this case, the input speed is kept at a low value, so that the gear ratio set by the continuously variable transmission is kept at a value on the high side (or on the higher vehicle speed side). If a braking operation is made in this running state, therefore, the vehicle is stopped for a short time because of the heavy road load. The revolutions of the continuously variable transmission stop accordingly, and it may be impossible to set the gear ratio on the lowest side (on the lower vehicle speed side), as demanded at the starting time. In the belt-type continuously variable transmission, more specifically, it is known that a transmission member such as a belt is brought into frictional contact with a rotary element on the drive side and a rotary element on the output side so that the gear ratio may be changed by the changes in the contact positions. If the rotations of the continuously variable transmission stop, the contact positions of the transmission member cannot be changed. At the starting time, it is inevitable to employ a gear ratio smaller than that on the lowest speed side, so that the driving force for the start becomes short.

SUMMARY OF THE INVENTION

A main object of the invention is to provide a control system for a continuously variable transmission, which can make a driving force necessary and sufficient for a heavy load time and which has excellent characteristics in that a gear ratio for the vehicle to stop is reliably set to a gear ratio on the lowest speed side.

In order to achieve the above-specified object, the invention is characterized in that the restriction executing conditions, as based on the lower limit speed set for the target input speed, are changed according to the road load. More specifically, in a shift control system for a continuously variable transmission of the invention, road load on a vehicle is detected, a lower limit speed according to the detected road load is set, a target input speed according to the running state of a vehicle is restricted with the low limit speed, and gear ratio of the continuously variable transmission is controlled so that an actual input speed may be equal to the target input speed restricted. Moreover, the shift control system of this invention is characterized in that the target input speed is restricted on condition that the actual input speed exceeds the lower limit value, when the road load is light, and the target input speed is restricted irrespective of the condition when the road load is heavy.

In the invention, therefore, according to the road load of the vehicle, the lower limit value of the target input speed of the continuously variable transmission is set, but the target input speed on the basis of the lower limit value is restricted on the basis of the magnitude of the road load. When the road load at or after the time of setting the lower limit speed is light, more specifically, the target input speed on the basis of the lower limit value is restricted on condition that the actual input speed exceeds the lower limit value. When the road load is light or when the actual input speed is less than the lower limit value, therefore, the target input speed is not restricted immediately after the lower limit speed is set. While the vehicle is running on an uphill road with a gentle gradient as in the case in which the road load is light, therefore, the speed of the prime mover is prevented from being increased although no accelerator depression is performed. If the actual input speed exceeds the lower limit speed, on the other hand, the target input speed is restricted on the basis of the lower limit value, so that the input speed, i.e., the driving force speed can be kept later at a large value to retain the driving force. In short, the drivability is improved. If the road load is heavy at the time or after a lower limit speed is set according to the road load, on the other hand, the target input speed is immediately restricted to the lower limit value. As a result, a gear ratio of the continuously variable transmission is set to that on the low side (or the low vehicle speed side). Even when the vehicle is stopped for a short time by the decelerating or braking operation, therefore, the gear ratio can be returned to that of or approximate to the lowest speed side. Thus, according to the invention, it is possible to keep both the excellent drivability and the returning performance of the gear ratio to the lowest speed side.

According to the invention, on the other hand, the lower limit speed can be changed and set to a value according to the detected road load and a vehicle speed, and to a value higher than the road load value under the road load at least in a low vehicle speed range, when the road load is heavy.

With this construction, therefore, the lower limit speed is set on the basis of the road load and the vehicle speed. When the road load is heavy and the vehicle speed is in the low vehicle speed range, moreover, the lower limit speed is set to a value higher than the road load speed under the road load. On an uphill road with a steep gradient, as an example of the heavy load, therefore, there is kept the state in which the actual input speed is increased to a high value. Even if the vehicle is stopped for a short time in accordance with the braking operation, therefore, the gear ratio easily returns to that on the lowest speed side.

In addition to the aforementioned construction, the shift control system of the invention may be constructed to further comprise shift position selecting device for selecting a shift position for an ordinary run and a brake position for causing a braking action by a prime mover more than the case in which the vehicle runs at the shift position. The restriction on the target input speed can be released on condition that the road load is light, when a shifting operation is made from the brake position to the shift position for the ordinary run.

With the construction having the heavy road load, therefore, even when the vehicle is stopped for a short time by the deceleration or by the braking operation, the gear ratio easily returns to that on the lowest speed side for the short time because it is relatively high. With the construction having the light road load, on the other hand, when the shift is changed from the brake position to the shift position for the ordinary run, that is, when the upshift is manually effected, there is released the restriction on the target input speed based on the lower limit value. As a result, the target input speed is reduced to reduce the speed of the prime mover. This is the change in the gear ratio in accordance with the intention of the driver to change speed. In this invention, therefore, it is possible to make a speed change according to the intention of the driver without deteriorating the returnability of the gear ratio to the lowest speed side.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 3:
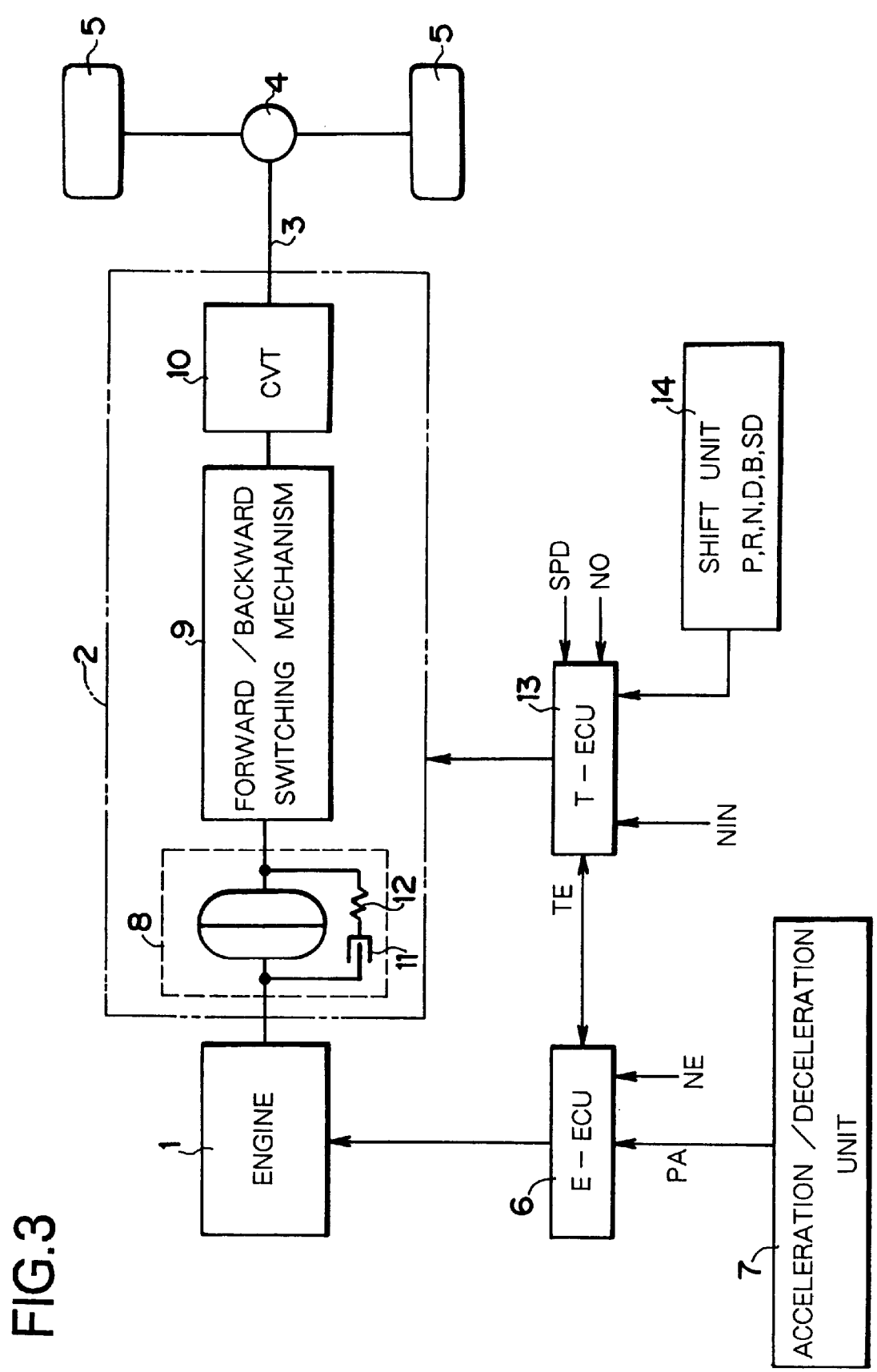
FIG. 3 is a block diagram schematically showing a drive system of a vehicle, to which the invention is directed, and a control system for the drive system.

The invention will be specifically described in connection with its embodiments. First of all, here will be described one example of a power transmission line of a vehicle, to which the invention is directed. In FIG. 3, a prime mover 1 is connected to a transmission mechanism 2, an output shaft 3 of which is connected through a differential 4 to right and left driving wheels 5. Here, the prime mover 1 includes a variety of prime movers to be employed in the vehicle, such as an internal combustion engine, e.g., a gasoline engine or Diesel engine, an electric motor such as a motor or a unit combining those internal combustion engine and electric motor. In the following description, the prime mover 1 is exemplified either by the so-called "direct injection engine" which can perform a homogeneous combustion or a stratified combustion by injecting fuel directly into a cylinder and by controlling the injection rate and timing, or by the gasoline engine which is equipped with an electronic throttle valve capable of controlling the throttle opening electrically and freely.

This engine 1 is so constructed to be electrically controlled and therefore equipped with an electronic control unit (E-ECU) 6 which is composed mainly of a microcomputer for the electric control. This electronic control unit 6 is constructed to control at least the output of the engine 1 and is fed with a demanded drive quantity including an output speed (or an engine speed) NE and an accelerator depression or opening PA as data for this control.

These demanded drive quantities are, in short, signals for increasing/decreasing the output of the engine 1, and can adopt either a operation amount signal of an acceleration/deceleration unit 7 such as an accelerator pedal to be operated by the driver, or a signal obtained by processing the operation amount signal electrically. In addition, there is adopted a demand drive signal which comes from a (not-shown) cruise control system for keeping the vehicle speed at a set value.

On the other hand, the speed changing mechanism 2 is constructed to include a fluid coupling mechanism 8, a forward/backward switching mechanism 9 and a continuously variable transmission (CVT) 10. The fluid coupling mechanism 8 is, in short, a device for transmitting the torque through a fluid or oil between an input side member and an output side member. This device is exemplified by a torque converter which is adopted in an ordinary vehicle. On the other hand, this fluid coupling mechanism 8 is provided with a lock-up clutch 11. This lock-up clutch 11 is constructed to couple the input side member and the output side member directly by mechanical means such as friction discs, and is equipped with a damper 12 made of an elastic member such as a shock-absorbing coil spring.

When the fluid coupling mechanism 8 is provided for driving the engine 1 continuously even while the vehicle is stopped, an automatic clutch to be automatically applied/ released on the basis of the state of the vehicle can be employed in place of the aforementioned fluid coupling mechanism 8.

The fluid coupling mechanism 8 is connected at its input member to the output member of the engine 1 and at its output member to the input member of the forward/backward switching mechanism 9. This forward/backward switching mechanism 9 is constructed of a double-pinion type planetary gear mechanism, for example, which is composed of: a sun gear and a carrier, one of which acts as an input element and the other as an output element; brake means for fixing a ring gear selectively; and clutch means for connecting any two rotary elements of three elements, that is, the sun gear, the carrier and the ring gear selectively to integrate the entire planetary gear mechanism. In short, the forward/backward switching mechanism 9 is constructed to set the forward state by applying the clutch means and to set the backward state by applying the brake means.

The continuously variable transmission 10, as shown in FIG. 3, is a mechanism capable of varying a ratio between the speed of a member on its input side and the speed of a member on its output side, i.e., a gear ratio steplessly (or continuously), and can adopt the belt-type continuously variable transmission or the toroidal-type continuously variable transmission. One example of the belt-type continuously variable transmission 10 will be briefly described with reference to FIG. 4. This mechanism 10 is constructed to include: a driving pulley (or primary pulley) 20; a driven pulley (or secondary pulley) 21; and a belt 22 made to run on those pulleys 20 and 21. These pulleys 20 and 21 are individually composed of: stationary sheaves 23 and 24; movable sheaves 25 and 26 for moving toward and away from the stationary sheaves 23 and 24; and hydraulic actuators 27 and 28 for pushing the movable sheaves 25 and 26 toward the stationary sheaves 23 and 24.

The driving pulley 20 is mounted on an input shaft 29, and the driven pulley 21 is mounted on an output shaft 30 arranged in parallel with the input shaft 29. To the hydraulic actuator 28 in the driven pulley 21, moreover, there is fed an oil pressure corresponding to the demanded drive quantity represented by the accelerator depression PA, so that the belt 22 is given a tension necessary for transmitting the torque. To the hydraulic actuator 27 of the driving pulley 20, on the other hand, there is fed working oil for establishing a gear ratio to equalize the speed of the input shaft 29 to the target input speed. In short, by changing the widths of grooves (i.e., gaps between the stationary sheaves 23 and 24 and the movable sheaves 25 and 26) in the individual pulleys 20 and 21, the winding radii of the belt 22 on the individual pulleys 20 and 21 are changed to larger or smaller values to execute the speed change.

Figure 4:
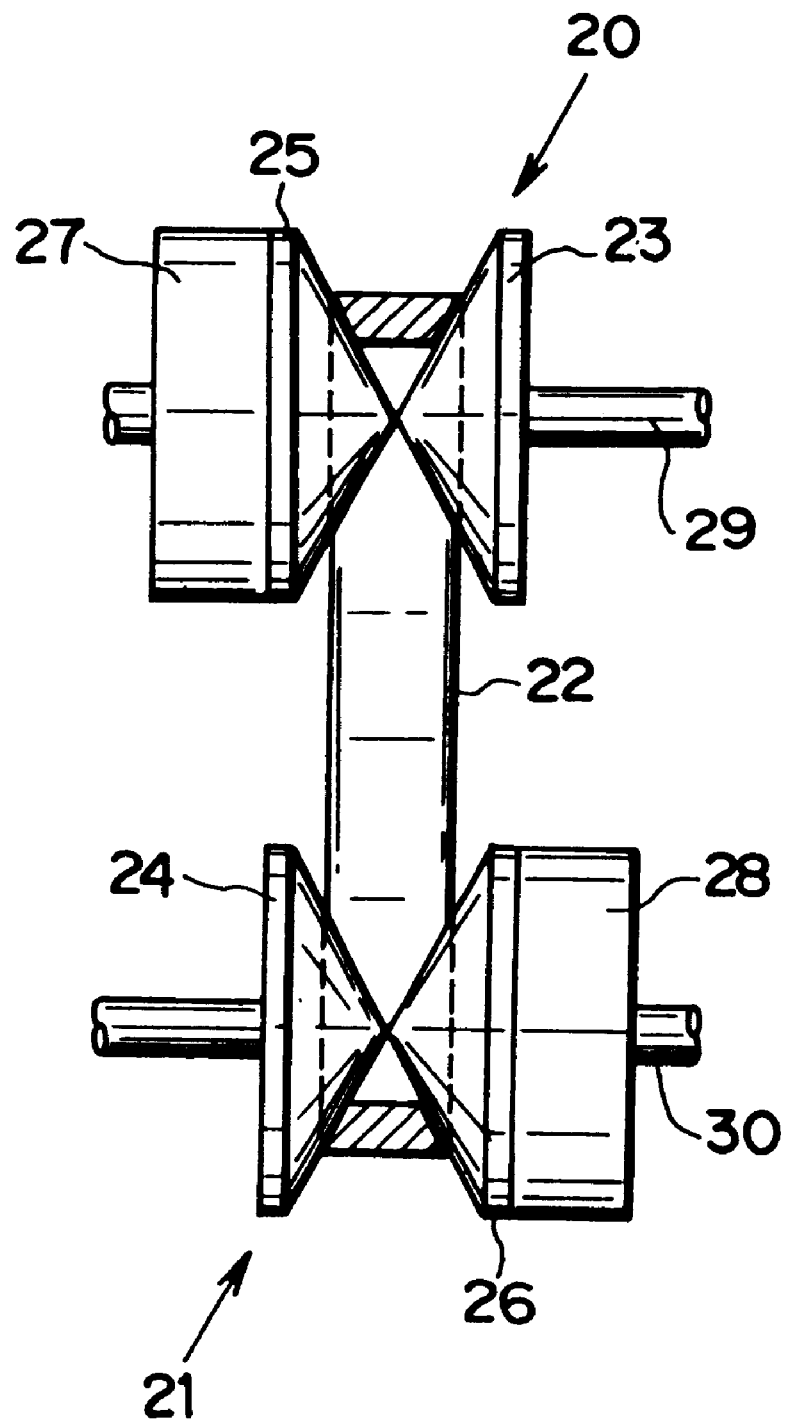
FIG. 4 is a diagram showing one example of a continuously variable transmission of the drive system schematically.

In the continuously variable transmission 10 shown in FIG. 4, therefore, a gear ratio on the lowest side (i.e., a maximum gear ratio) $\gamma_{max}$ is set when the winding radius of the belt 22 on the driving pulley 20 is minimum and the winding radius of the belt 22 on the driven pulley 21 is maximum. On the contrary, a gear ratio on the highest side (i.e., a minimum gear ratio) $\gamma_{min}$ is set when the winding radius of the belt 22 on the driving pulley 20 is maximum and the winding radius of the belt 22 on the driven pulley 21 is minimum. Moreover, it is called the "belt return" to establish the winding state of the belt 22 for setting the maximum gear ratio, and the feasibility of establishing that state is called the "belt returning performance" (or the "belt returnability").

The controls of the individual states of the application/release and the slipping half-application of the lock-up clutch 11 in the speed changing mechanism 2 and the controls of the forward/backward switching actions of the mechanism 9 and the gear ratio in the continuously variable transmission 10 are basically made on the basis of the running state of the vehicle. For these controls, there is provided an electronic control unit (T-ECU) 13 which is constructed mainly of a microcomputer.

This electronic control unit 13 is connected in a data communicating manner with the aforementioned electronic control unit 6 for the engine, and is fed with control data including a vehicle speed SPD, and the output speed No and the input speed NIN of the speed changing mechanism 2. With the electronic control unit 13, there is electrically connected a shift unit 14 for selecting following individual states (or positions) for the speed changing mechanism 2: a stop state (or a parking position: P); a backward state (or a reverse position: R); a neutral state (or a neutral position: N); an automatic forward state in which a gear ratio is automatically set according to running states of the vehicle and an ordinary run is made (or a drive position: D); the state of adopting a pumping loss of the engine 1 as a braking force (or a brake position: B); and the state of inhibiting the setting of a gear ratio on a higher speed side than a predetermined value (or a SD position).

The gear ratio of the continuously variable transmission 10 is basically controlled so that the speed of the engine 1 i.e., the input speed of the continuously variable transmission 10) may be a speed (or running state) for the minimum fuel consumption. When the road load is so heavy as experienced by an uphill run, however, the target input speed is restricted to a predetermined lower limit value or more so that the speed of the engine 1 may be kept at a level to retain the driving force. The shift control system according to the invention is so constructed mainly of the electronic control unit 13 for the continuously variable transmission 10 as to execute the controls for setting a lower limit speed and for restricting a target input speed to the lower limit value, as will be described in the following.

Figure 1:
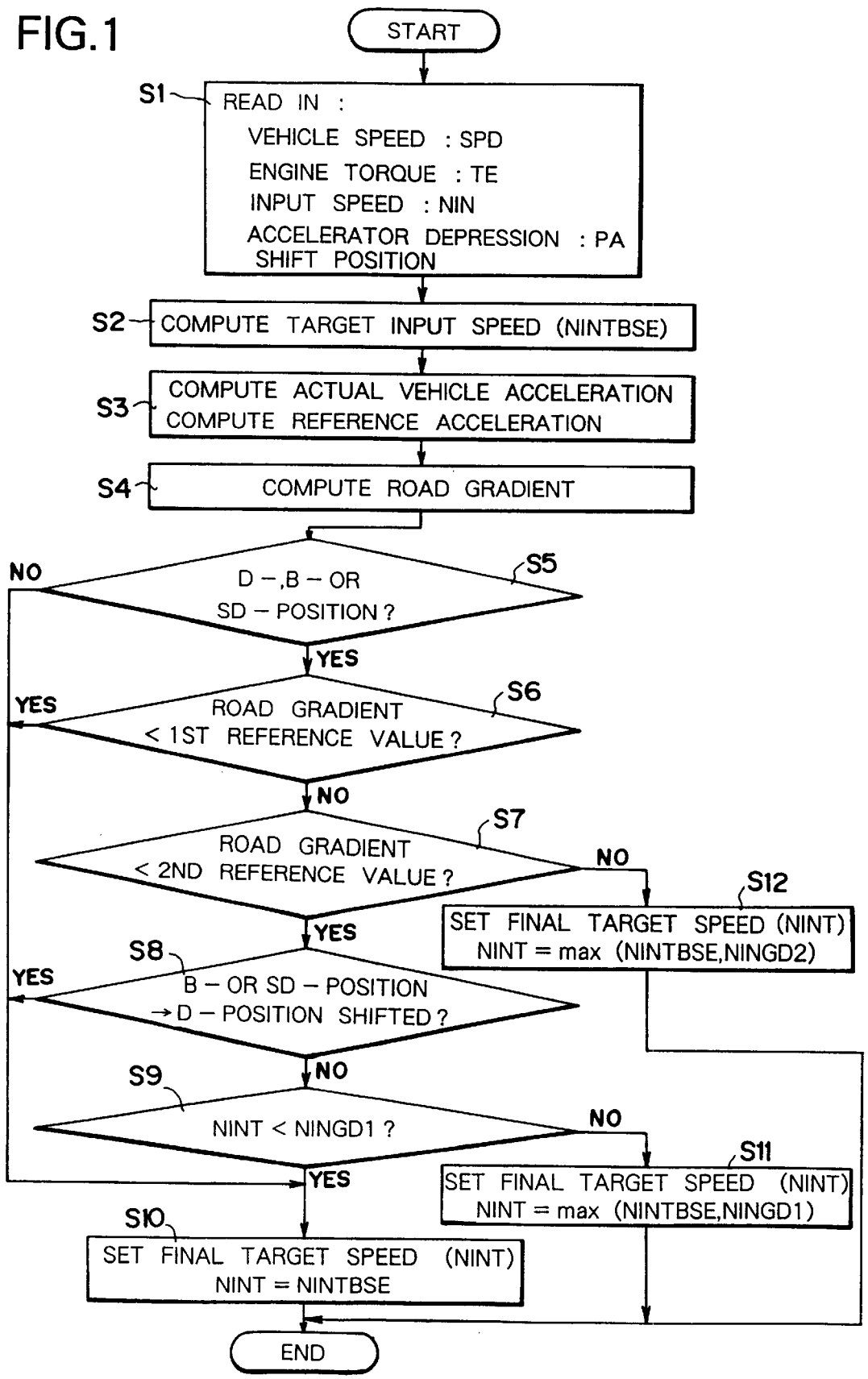
FIG. 1 is a flow chart showing an example of the control to be executed by a shift control system according to the invention.

FIG. 1 is a flow chart for explaining an example of the controls, the routine of which is repeatedly executed at a predetermined short time interval. First of all, the vehicle speed SPD, the engine torque TE, the input speed NIN, the accelerator depression PA and the shift position are read in (at Step S1). The vehicle speed SPD can be detected by a not-shown vehicle speed sensor, and the engine torque TE can be obtained on the basis of an intake air flow, as obtained by a not-shown air flow meter, and a map. Moreover, the input speed NIN is an input value to the continuously variable transmission 10 and can be detected by a not-shown input speed sensor. Still moreover, the accelerator depression PA can be obtained by detecting a depression angle of the accelerator pedal or one example of the acceleration/deceleration unit 7, and the shift position can be detected by a not-shown sensor which is disposed in the shift unit 14.

Next, on the basis of these read data, a target input speed (NINTBSE) is computed (at Step S2). This computation can be performed by the method known in the art, and the speed of the optimum running point for the minimum fuel consumption is determined as a target input speed from the map or the like on the basis of the demanded drive quantity, as indicated by the accelerator depression PA, and the vehicle speed SPD, or the alternative data.

In order to detect the gradient of the road surface as the road load on the vehicle, moreover, there are computed (at Step S3) the actual acceleration and reference acceleration of the vehicle. The former actual acceleration can be computed as a change of the vehicle speed SPD per a unit time. The latter reference acceleration is obtained when the vehicle runs on a flat road, and is stored in advance in the form of a map as values according to the acceleration depression PA and the vehicle speed SPD, so that a value corresponding to an accelerator depression PA and a vehicle speed SPD, as detected, are determined as a reference acceleration from the map.

The road gradient is computed (at Step S4) from the actual acceleration and the reference acceleration thus determined. If the road surface is sloped, more specifically, the acceleration or deceleration according to the gradient acts on the vehicle, so that a difference between the reference acceleration, as determined on the basis of the acceleration depression PA and the vehicle speed SPD, and the actual acceleration is made to take a value according to the gradient of the road surface. By determining the relation between the acceleration and the road gradient in advance, therefore, the road gradient is computed on the basis of a difference in the computed acceleration.

Still moreover, it is decided (at Step S5) what of the D-position, the B-position and the SD-position a selected shift position belongs to. This decision can be made on the basis of a signal which is outputted from the shift unit 14, as has been described hereinbefore. If the answer of Step S5 is affirmative because an engine bake position of the D-position, the B-position or the SD-position is selected, it is decided (at Step S6) whether or not the road gradient computed at Step S4 is smaller than a first reference value. In short, this decision Step is one for deciding whether or not the road surface is flat, so that the first reference value is set to such a small value as to distinguish between the flat road and the uphill road.

If the road surface is uphill, the answer of Step S6 is negative. Then, it is decided (at Step S7) whether or not the road gradient computed at Step S4 is smaller than a second reference value. This decision step is one for deciding a gradient so that different controls may be executed depending on whether an uphill road is gentle or steep. Therefore, the second reference value is larger than the foregoing first reference value and is predetermined to a proper value.

If the answer of Step S7 is affirmative, the road surface is uphill and has a gentle gradient. In this case, it is decided (at Step S8) whether or not the engine brake position such as the B-position or the SD-position for effecting the engine brake has been shifted to the D-position. This is a step for deciding whether or not the change in a target input speed NINT is caused by the manual operation of the driver or by the change in the running state of the vehicle.

Figure 2:
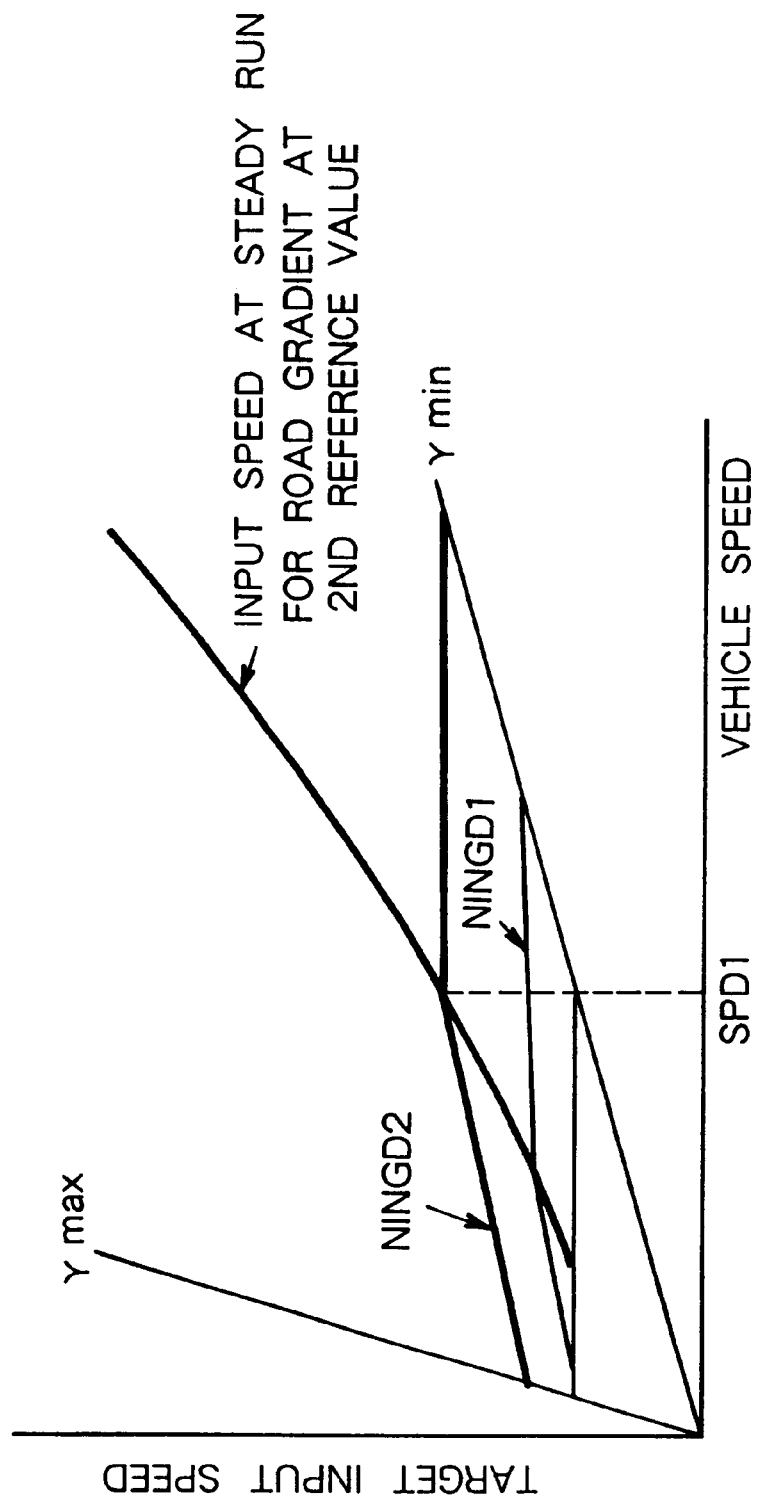
FIG. 2 is a diagram illustrating a lower limit speed for a target input speed and an input speed (or a road load speed) of the case in which the vehicle runs steadily on an uphill road with a gradient equal to a second reference value.

If the answer of Step S8 is negative because the B-position or the SD-position is selected, or because a time has elapsed after the selection of the D-position or because the D-position is shifted from a shift position other than the brake positions such as the N-position, it is decided (at Step S9) whether or not a final target input speed NINT is less than a first lower limit speed NINGD1. This first lower limit speed NINGD1 is rather more than a speed based on the idling of the engine 1 or a speed according to a gear ratio $\gamma_{min}$ on the highest speed side, as mechanically determined by the continuously variable transmission 10, as illustrated in FIG. 2. Here in the example illustrated in FIG. 2, the first lower limit speed NINGD1 is equal, in the low vehicle speed range, to a value based on the idling. In the high vehicle speed range, on the other hand, the first lower limit speed NINGD1 is equal to a value according to the gear ratio on the highest vehicle speed side, as mechanically determined by the continuously variable transmission 10.

If the answer of Step S9 is affirmative, that is, if the final target input speed NINT is less than the first lower limit speed NINGD1, the final target speed NINT is set (at Step S10) to the target input speed NINTBSE computed at Step S2. After this, this routine is ended.

Specifically, the gear ratio of the continuously variable transmission 10 is so controlled that the input speed may be equal to the target input speed NINTBSE determined on the basis of either the accelerator depression PA and the vehicle speed SPD or the predetermined map. In other words, the target input speed is controlled on the basis of the running state of the vehicle, but its lower limit speed is not limited to a manually set lower limit value. As a result, the actual input speed NIN is not forcibly increased without any accelerating/decelerating operation such as the accelerator depression but only by the decision result of the road gradient.

If the answer of Step S9 is negative, that is, if the final target input speed NINT is not less than the first lower limit speed NINGD1, on the other hand, the final target speed NINT is set (at Step S11) to a larger value (max (NINTBSE, NINGD1)) of the target input speed NINTBSE computed at Step S2 and the first lower limit speed NINGD1. After this, this routine is ended. On condition that the actual input speed NIN exceeds the first lower limit speed NINGD1, the final target speed NINT is restricted to the first lower limit speed NINGD1 if the target input speed NINTBSE computed on the basis of the running state of the vehicle is less than the first lower limit speed NINGD1.

Thus, when the gradient of the uphill road being traveled is gentle, that is, when the road load is relatively light, the road load is heavier than that of the run on the flat road, so that a lower limit value of the input speed is set. If the actual input speed is less than that lower limit value, however, there is not restricted the target input speed by the lower limit value. If the actual input speed increases from the lower limit value, on the contrary, the target input speed is restricted on the basis of that lower limit speed. It is, therefore, avoided to decide the gradient of the road surface (i.e., to decide the road load) without operating the accelerator thereby to increase the input speed, i.e., to cause the speed change. If the actual input speed increases more than the lower limit speed set manually, on the other hand, it is restricted, in the later state with the road load being not less than a predetermined value, that the target input speed becomes less than the lower limit value. As a result, the driving force can be retained in the state of the heavy road load.

If the answer of Step S7 is negative because the road gradient is large, on the other hand, the final target speed NINT is set (at Step S12) to the larger value (max (NINTBSE, NINGD2)) of the target input speed NINTBSE computed at Step S2 and a second lower limit speed NINGD2. After this, this routine is ended. One example of this second lower limit speed NINGD2 is illustrated in FIG. 2 and is set to a larger value than that of the aforementioned first lower limit speed NINGD1. On the other hand, FIG. 2 additionally illustrates a line indicating the input speed (or the road load speed) of the case of a steady run on an uphill having the road gradient of the aforementioned second reference value, and the line indicating the second lower limit speed NINGD2 and the line indicating the road load speed intersect at a predetermined vehicle speed SPD1. In other words, in the vehicle speed range lower than that vehicle speed SPD1, the second lower limit speed NINGD2 is set to a value more than the road load speed.

According to the control at Step S12, therefore, if the target input speed NINTBSE computed on the basis of the running state of the vehicle is less than the second lower limit speed NINGD2, the gear ratio is so controlled that the actual input speed may be increased to the target speed or the second lower limit speed NINGD2. If the target input speed NINTBSE computed on the basis of the running state of the vehicle is more than the second lower limit speed NINGD2, the gear ratio is so controlled that the actual input speed may be equal to the input target speed NINTBSE. Therefore, the actual input speed is kept more than the second lower limit NINGD2, and the gear ratio is accordingly kept at a large value.

Thus in the state of a large road gradient, i.e., in the state of a heavy road load, the vehicle is stopped within a short time period by the decelerating operation, but the set gear ratio is so high that it can be changed within a short time to the maximum gear ratio $\gamma_{max}$ on the lowest speed side that is demanded at the starting time. In other words, the returnability of the belt in the continuously variable transmission 10 is improved. Especially in the construction for the controls shown in FIG. 1, the second lower limit speed NINGD2 in the low vehicle speed range is set to a larger value so that the gear ratio of the continuously variable transmission 10 is accordingly raised. Even if the time period from the low vehicle speed to the vehicle stop is short, therefore, it is sufficient for the gear ratio to return to the maximum value $\gamma_{max}$ so that the belt returnability is improved.

Here, if the answer of Step S5 in FIG. 1 is negative, that is, if none of the D-, B- and SD-positions is selected, the routine advances directly to Step S10, at which the final target speed NINT is set to the target value NINTBSE which is computed on the basis of the running state. This is because the driving force on the uphill need not be retained at the P-, R- and N-positions.

If the answer of Step S6 is affirmative because the vehicle is running on the flat road, on the other hand, the lower limit speed for the target input speed is not restricted because of the light road load, so that the routine advances directly to Step S10. If the answer of Step S9 is affirmative because the shift position is changed from the brake position to the D-position, moreover, the lower limit speed for the target input speed is not restricted, but the routine advances directly to Step S10, so as to give priority to the control mode of the gear ratio, as selected by the driver, that is, so as to prevent the speed change from being undone although a speed change (or an upshift) has been operated by the driver.

Here will be described the relations of the aforementioned specific embodiment and the invention. The functional means of Steps S3 and S4 shown in FIG. 1 correspond to road load detector of the invention; the functional means of Steps S5 to S12 correspond to lower limit speed setter and restrictor of the invention; the electronic control unit 13 for the continuously variable transmission 10, as shown in FIG. 3, correspond to gear ratio controller of the invention; and the shift unit 14 shown in FIG. 3 corresponds to shift position selector of the invention.

Here, the specific embodiment has been described on the example in which the actual acceleration and the reference acceleration are used for detecting the road load. However, the invention should not be limited to the aforementioned specific embodiment, but the detection of the road load may be made by suitable means, if necessary.

In the foregoing specific embodiment, on the other hand, the condition that the actual input speed is more than the lower limit speed is decided by deciding whether or not the final target input speed is less than the lower limit value, that is, whether or not the final target input speed is more than the lower limit value, and the target input speed is restricted in addition to that decision. However, the invention should not be limited to the aforementioned specific embodiment. For example, it is directly decided whether or not the actual input speed is more than the lower limit value. If it is once decided that the actual input speed is more than the lower limit value, the target input speed may be restricted after the decision. On the other hand, by comparing the demanded drive quantity such as the accelerator depression for determining the target input speed with the predetermined value, it is decided whether or not the actual input speed is more than the lower limit value. If it is decided that the demanded drive quantities are larger than the predetermined value and that the actual input speed is more than the lower limit value, the target input speed may be restricted after the decision.

Here will be synthetically described the advantages to be obtained in the invention. As has been described hereinbefore, there may occur the case in which the road load at the time of setting the lower limit value of the target input speed is relatively low although the lower limit speed is set because of a heavy road load. If the actual input speed is less than the lower limit value, according to the invention, the restriction of the target input speed by the lower limit value is executed not instantly but after the actual input speed exceeds the lower limit value. Without any manipulation for the acceleration or the like, therefore, the input speed can be prevented from increasing, so that the drivability is improved. When the road load at the time of setting the lower limit speed is relatively high, on the other hand, the lower limit speed of the target value is instantly restricted so that the gear ratio of the continuously variable transmission is kept at a high value accordingly. Therefore, it is not only possible to retain the driving force but also easy to return the gear ratio to the maximum value on the lowest speed side for a short time period until the vehicle stops, so that the belt-type continuously variable transmission can improve the so-called "belt returning performance".

According to the invention, on the other hand, the aforementioned lower limit speed in the low vehicle speed range is set to a larger value than that of the road load speed. Even for the short time period from the low vehicle speed to the stop, therefore, the gear ratio is easily returned to the maximum gear ratio so that the belt-type continuously variable transmission can improve the so-called "belt returning performance".

There may also occur the case in which the brake position for restricting the gear ratio to a relatively high value is manually shifted to a position for the ordinary run. If the road load is relatively light in this case, the restriction on the lower limit speed for the target input speed is released according to the invention. Therefore, the gear ratio can be controlled while giving priority to the intention of the driver, to avoid the physical discomfort or the deterioration in the drivability.

What is claimed is:

1. A shift control system for a continuously variable transmission to control a gear ratio so that an actual input speed may be equal to a target input speed, comprising:

road load detector for detecting a road load on a vehicle;

lower limit speed setter for setting a lower limit speed according to a detected road load;

restrictor for restricting said target input speed on condition that the actual input speed is more than said lower limit speed, when said road load is light, and for restricting said target input speed irrespective of said condition when said road load is heavy; and gear ratio controller for controlling the gear ratio of the continuously variable transmission so that the actual input speed may be equal to the target input speed restricted.

2. A shift control system for a continuously variable transmission according to claim 1, wherein said lower limit speed setter includes a unit for changing and setting said lower limit speed to a value according to the road load detected and a vehicle speed, and for setting said lower limit speed to a value higher than the road load value under the road load at least in a low vehicle speed range, when said road load is heavy.

3. A shift control system for a continuously variable transmission according to claim 2, further comprising:

shift position selecting device for selecting a shift position for an ordinary run and a brake position for causing a braking action by a prime mover more than the case in which the vehicle runs at said shift position, wherein said restrictor includes a unit for releasing the restriction on said target input speed on condition that said road load is light, when a shift operation is made from said brake position to said shift position for the ordinary run.

4. A shift control system for a continuously variable transmission according to claim 1, further comprising:

shift position selecting device for selecting a shift position for an ordinary run and a brake position for causing a braking action by a prime mover more than the case in which the vehicle runs at said shift position, wherein said restrictor includes a unit for releasing the restriction on said target input speed on condition that said road load is light, when a shift operation is made from said brake position to said shift position for the ordinary run.

5. A shift control system for a continuously variable transmission according to claim 1, wherein said restrictor includes a unit for setting a restriction speed of said target input speed when said road load is heavy, to a larger value than the restriction value of said target input speed when said road load is light.

6. A shift control system for a continuously variable transmission according to claim 1, further comprising:

a shift mechanism capable of making an upshift manually for lowering the gear ratio, wherein said restrictor includes a unit for releasing the restriction on said target input speed on condition that said road load is light, when the upshift is manipulated.

7. A shift control system for a continuously variable transmission according to claim 1, wherein said road load detector includes a unit for computing the road load from a reference acceleration, computed on the basis of a demanded drive quantity, and an actual acceleration detected.

8. A shift control system for a continuously variable transmission according to claim 1, wherein said road load detector includes a unit for computing a gradient of a road from a reference acceleration, as computed on the basis of the demanded drive quantity, and an actual acceleration detected, to decide that the road load is heavy, when the road gradient computed is larger than a predetermined reference value.

9. A shift control system for a continuously variable transmission according to claim 1, further comprising:

a decider for deciding whether the condition that the actual input speed is more than said lower limit speed is satisfied, on the basis of the fact that a target value of the input speed is larger than said lower limit value.

10. A shift control system for a continuously variable transmission according to claim 1, wherein said lower limit speed setter includes means for setting the lower limit speed to a larger value of the target input speed, as computed on the basis of the demanded drive quantity, and a predetermined lower limit speed.

11. A shift control system for a continuously variable transmission to control a gear ratio so that an actual input speed may be equal to a target input speed, comprising a controller which executes controls of:

detecting a road load on a vehicle;

setting a lower limit speed according to a detected road load;

restricting said target input speed on condition that the actual input speed is more than said lower limit speed, when said road load is light, and for restricting said target input speed irrespective of said condition when said road load is heavy; and controlling the gear ratio of the continuously variable transmission so that the actual input speed may be equal to the target input speed restricted.

12. A shift control system for a continuously variable transmission according to claim 11, further comprising a step of judging whether the condition that the actual input speed is more than said lower limit speed is satisfied, on the basis of the fact that a target value of the input speed is larger than said lower limit value.

13. A shift control system for a continuously variable transmission according to claim 11, further comprising:

shift position selecting device for selecting a shift position for an ordinary run and a brake position for causing a braking action by a prime mover more than the case in which the vehicle runs at said shift position, wherein the controller further executes a control for releasing the restriction on said target input speed on condition that said road load is light, when a shift operation is made from said brake position to said shift position for the ordinary run.

14. A shift control system for a continuously variable transmission according to claim 11, further comprising:

a shift mechanism capable of making an upshift manually for lowering the gear ratio, wherein the controller further executes a control for releasing the restriction on said target input speed on condition that said road load is light, when the upshift is manipulated.

15. A shift control system for a continuously variable transmission according to claim 11, wherein the controller executes judging whether the condition that the actual input speed is more than said lower limit speed is satisfied, on the basis of the fact that a target value of the input speed is larger than said lower limit value.

16. A shift control method for a continuously variable transmission to control a gear ratio so that an actual input speed may be equal to a target input speed, comprising steps of:

detecting a road load on a vehicle;

setting a lower limit speed according to a detected road load;

restricting said target input speed on condition that the actual input speed is more than said lower limit speed, when said road load is light, and for restricting said target input speed irrespective of said condition when said road load is heavy; and controlling the gear ratio of the continuously variable transmission so that the actual input speed may be equal to the target input speed restricted.

17. A shift control method for a continuously variable transmission according to claim 16, further comprising:

a step of releasing the restriction on said target input speed on condition that said road load is light, when a shift operation is made from a brake position for causing a braking action by a prime mover to a shift position for causing a lower braking action than the braking action at the brake position.

18. A shift control method for a continuously variable transmission according to claim 16, further comprising a step of releasing the restriction on said target input speed on condition that said road load is light, when the upshift is manually operated.

* * * * *

UNITED STATES PATENT AND TRADEMARK OFFICE
CERTIFICATE OF CORRECTION

PATENT NO. : 6,405,115 B2
DATED : June 11, 2002
INVENTOR(S) : Hiroji Taniguchi et al.

It is certified that error appears in the above-identified patent and that said Letters Patent is hereby corrected as shown below:

<u>Column 11,</u>
Line 17, change "according to claim 2, further comprising" to -- according to claim 1, further comprising --.
Line 29, change "according to claim 1, further comprising" to -- according to claim 2, further comprising --.

Signed and Sealed this

Twenty-fifth Day of March, 2003

JAMES E. ROGAN
*Director of the United States Patent and Trademark Office*